United States Patent
Mullen et al.

(10) Patent No.: US 12,211,077 B1
(45) Date of Patent: Jan. 28, 2025

(54) VEHICLE SAFETY INFORMATION SYSTEM

(71) Applicant: STATE FARM MUTUAL AUTOMOBILE INSURANCE COMPANY, Bloomington, IL (US)

(72) Inventors: Christina P. Mullen, Normal, IL (US); Earl F. Hyser, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 538 days.

(21) Appl. No.: 16/908,274

(22) Filed: Jun. 22, 2020

Related U.S. Application Data

(63) Continuation of application No. 15/235,591, filed on Aug. 12, 2016, now Pat. No. 10,733,648.
(Continued)

(51) Int. Cl.
| | | |
|---|---|---|
| *G06Q 30/0601* | (2023.01) | |
| *H04L 67/02* | (2022.01) | |
| *H04L 67/12* | (2022.01) | |

(52) U.S. Cl.
CPC ......... *G06Q 30/0623* (2013.01); *H04L 67/02* (2013.01); *H04L 67/12* (2013.01)

(58) Field of Classification Search
CPC .......... G06Q 30/06–0645; G06Q 50/01; H04L 67/02; H04L 67/12; G16Y 10/00–90
See application file for complete search history.

(56) References Cited

U.S. PATENT DOCUMENTS

| | | | |
|---|---|---|---|
| 7,142,101 B2 * | 11/2006 | Morris | G07C 5/008 701/29.6 |
| 7,970,540 B2 | 6/2011 | Laberteaux et al. | |

(Continued)

FOREIGN PATENT DOCUMENTS

| | | |
|---|---|---|
| EP | 3239686 A1 | 11/2017 |
| EP | 3578433 B1 | 8/2020 |

(Continued)

OTHER PUBLICATIONS

Insurance Broker Companies; Researchers Submit Patent Application, "Systems and Methods to Assess the Condition of a Vehicle, for Approval." 2015. Insurance Weekly News, May 1, 219. https://dialog.proquest.com/professional/docview/1674736270?accountid=161862. (Year: 2015).

*Primary Examiner* — Adam L Levine
(74) *Attorney, Agent, or Firm* — MARSHALL, GERSTEIN & BORUN LLP

(57) ABSTRACT

A vehicle safety information system is presented that may include a user computing device configured to determine whether identifying information associated with a first vehicle is to be transmitted to at least one additional device. The user computing device may also be configured to transmit the identifying information based on this determination. The user computing device may further be configured to receive, in response to a determination via the at least one additional device that safety information associated with the first vehicle is to be provided, the safety information. The determination that the safety information is to be provided may be based on information available at the at least one additional device. The at least one additional device may access and transmit the safety information to the user computing device so that the safety information is made available to a user.

20 Claims, 6 Drawing Sheets

Related U.S. Application Data

(60) Provisional application No. 62/245,485, filed on Oct. 23, 2015.

(56) References Cited

U.S. PATENT DOCUMENTS

| | | | |
|---|---|---|---|
| 8,600,411 B2 * | 12/2013 | Subramanian | G01C 21/20 |
| | | | 455/456.3 |
| 8,650,093 B2 * | 2/2014 | Seergy | G06Q 30/08 |
| | | | 705/26.4 |
| 8,731,977 B1 * | 5/2014 | Hardin | G06Q 40/08 |
| | | | 705/26.1 |
| 8,744,925 B2 | 6/2014 | Seergy et al. | |
| 9,141,984 B2 | 9/2015 | Seergy et al. | |
| 9,165,319 B1 * | 10/2015 | Henry | G06Q 30/0623 |
| 9,195,986 B2 | 11/2015 | Christy et al. | |
| 9,734,537 B2 * | 8/2017 | Christensen | G06Q 40/08 |
| 9,830,748 B2 | 11/2017 | Rosenbaum | |
| 9,990,782 B2 | 6/2018 | Rosenbaum | |
| 10,269,190 B2 | 4/2019 | Rosenbaum | |
| 10,467,824 B2 | 11/2019 | Rosenbaum | |
| 10,957,122 B1 * | 3/2021 | Sankovsky | G06Q 10/20 |
| 11,227,452 B2 | 1/2022 | Rosenbaum | |
| 11,407,410 B2 | 8/2022 | Rosenbaum | |
| 11,524,707 B2 | 12/2022 | Rosenbaum | |
| 11,594,083 B1 | 2/2023 | Rosenbaum | |
| 2013/0232027 A1 | 9/2013 | Reich et al. | |
| 2015/0286994 A1 * | 10/2015 | Elder | G06Q 10/20 |
| | | | 705/305 |
| 2022/0092893 A1 | 3/2022 | Rosenbaum | |
| 2022/0340148 A1 | 10/2022 | Rosenbaum | |
| 2023/0060300 A1 | 3/2023 | Rosenbaum | |

FOREIGN PATENT DOCUMENTS

| | | |
|---|---|---|
| EP | 3730375 B1 | 10/2021 |
| EP | 3960576 A1 | 3/2022 |
| EP | 4190659 A1 | 6/2023 |
| EP | 4190660 A1 | 6/2023 |

* cited by examiner

VEHICLE SAFETY INFORMATION SYSTEM

CROSS-REFERENCE TO RELATED APPLICATION

This application is a continuation of U.S. patent application Ser. No. 15/235,591, filed Aug. 12, 2016, which claims the benefit of U.S. Provisional Patent Application No. 62/245,485, filed on Oct. 23, 2015, which are hereby expressly incorporated by reference in their entireties.

FIELD OF THE DISCLOSURE

The present disclosure relates generally to vehicle safety and, more particularly, to a system used to provide vehicle safety information.

BACKGROUND

A vehicle owner or prospective purchaser may not know whether a vehicle that is owned or being considered for purchase is subject to one or more recalls and thus in need of repair, or whether such a vehicle otherwise has associated safety information of interest to the owner or prospective purchaser, such as one or more safety ratings associated with the vehicle. In some cases, this information may be obtained through publicly available sources. For example, the National Highway Traffic Safety Administration (NHTSA) maintains the web site <http://www.safercar.gov> through which information regarding recalls and other safety information may be obtained if a vehicle owner or prospective purchaser enters vehicle information through the web site. However, this technique for finding safety information not only requires the owner's or prospective purchaser's awareness of the web site and willingness to provide data through the web site in the first place, but more particularly requires the owner or prospective purchaser to enter specific data regarding the vehicle through the web site. Additionally, the need for an owner or prospective purchaser of a vehicle to be aware of an active recall pertaining to the vehicle is particularly important if the recall is for a safety defect.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a vehicle safety information system may be provided. The vehicle safety information system may include a user computing device configured to determine whether identifying information associated with a first vehicle is to be transmitted to at least one additional device via a computer network. The identifying information associated with the first vehicle may include at least one of information indicating a make of the first vehicle, information indicating a model of the first vehicle, information indicating a year of the first vehicle, or information indicating a vehicle identification number (VIN) of the first vehicle. The user computing device may also be configured to transmit, when it is determined that the identifying information associated with the first vehicle is to be transmitted to the at least one additional device via the computer network, the identifying information associated with the first vehicle to the at least one additional device via the computer network. The user computing device may further be configured to receive, in response to a determination via the at least one additional device that safety information associated with the first vehicle is to be provided to the user computing device, the safety information associated with the first vehicle via the computer network. The determination that the safety information associated with the first vehicle is to be provided to the user computing device may be based on information available at the at least one additional device. The safety information associated with the first vehicle may be provided to the user computing device by the at least one additional device accessing the safety information associated with the first vehicle and transmitting the safety information associated with the first vehicle via the computer network to the user computing device so that the safety information associated with the first vehicle is made available to a user of the user computing device. The safety information associated with the first vehicle may include at least one of: (i) information indicating whether at least one recall is associated with the first vehicle, (ii) information indicating whether at least one investigation is associated with the first vehicle, (iii) information indicating whether at least one other vehicle is determined via the at least one additional device to have at least one of a less severe recall status as compared to the first vehicle or a higher safety rating as compared to the first vehicle, or (iv) information indicating that the user of the user computing device is to provide further identifying information associated with the first vehicle to a remote computing device via a user interface of the user computing device so as to receive further safety information associated with the first vehicle from the remote computing device.

In another embodiment, a computer readable storage medium may be provided that includes non-transitory computer readable instructions stored thereon for receiving safety information associated with a first vehicle. The instructions, when executed on one or more processors, may cause the one or more processors to determine whether identifying information associated with the first vehicle is to be transmitted to at least one additional device. The identifying information associated with the first vehicle may include at least one of information indicating a make of the first vehicle, information indicating a model of the first vehicle, information indicating a year of the first vehicle, or information indicating a vehicle identification number (VIN) of the first vehicle. The instructions, when executed on the one or more processors, may also cause the one or more processors to cause a user computing device including the one or more processors to transmit, when it is determined that the identifying information associated with the first vehicle is to be transmitted to the at least one additional device, the identifying information associated with the first vehicle to the at least one additional device. The instructions, when executed on the one or more processors, may further cause the one or more processors to receive, in response to a determination via the at least one additional device that the safety information associated with the first vehicle is to be provided to the user computing device, the safety information associated with the first vehicle. The determination that the safety information associated with the first vehicle is to be provided to the user computing device may be based on information available at the at least one additional device. The safety information associated with the first vehicle may be accessed by the at least one additional device and transmitted by the at least one additional device to the user computing device so that the safety information associated with the first vehicle is made available to a user of the user computing device. The safety information associated with the first vehicle may include at least one of: (i) information indicating whether at least one recall is associated with the first vehicle, (ii) information indicating whether at least one investigation is associated with the first vehicle, (iii) information indicating whether at least one other vehicle is determined via the at least one additional device to have at least one of a less severe recall status as compared to the first vehicle or a higher safety rating as compared to the first vehicle, or (iv) information indicating that the user of the user computing device is to provide further identifying information associated with the first vehicle to a remote computing device via a user interface of the user computing device so as to receive further safety information associated with the first vehicle from the remote computing device.

In yet another embodiment, a method for receiving safety information associated with a first vehicle may be provided. The method may include determining, using one or more processors of a user computing device, whether identifying information associated with the first vehicle is to be transmitted to at least one additional device via a computer network. The identifying information associated with the first vehicle may include at least one of information indicating a make of the first vehicle, information indicating a model of the first vehicle, information indicating a year of the first vehicle, or information indicating a vehicle identification number (VIN) of the first vehicle. The method may also include transmitting, using the one or more processors, when it is determined that the identifying information associated with the first vehicle is to be transmitted to the at least one additional device via the computer network, the identifying information associated with the first vehicle to the at least one additional device via the computer network. The method may further include receiving, using the one or more processors, in response to a determination via the at least one additional device that the safety information associated with the first vehicle is to be provided to the user computing device, the safety information associated with the first vehicle via the computer network. The determination that the safety information associated with the first vehicle is to be provided to the user computing device may be based on information available at the at least one additional device. The safety information associated with the first vehicle may be received at the user computing device by the safety information associated with the first vehicle being accessed by the at least one additional device and transmitted by the at least one additional device via the computer network to the user computing device so that the safety information associated with the first vehicle is made available to a user of the user computing device. The safety information associated with the first vehicle may include at least one of: (i) information indicating whether at least one recall is associated with the first vehicle, (ii) information indicating whether at least one investigation is associated with the first vehicle, (iii) information indicating whether at least one other vehicle is determined via the at least one additional device to have at least one of a less severe recall status as compared to the first vehicle or a higher safety rating as compared to the first vehicle, or (iv) information indicating that the user of the user computing device is to provide further identifying information associated with the first vehicle to a remote computing device via a user interface of the user computing device so as to receive further safety information associated with the first vehicle from the remote computing device.

BRIEF DESCRIPTION OF THE DRAWINGS

The figures described below depict various aspects of the system disclosed herein. It should be understood that each figure depicts an embodiment of a particular aspect of the disclosed system, and that each of the figures is intended to accord with a possible embodiment thereof. Further, wherever possible, the following description refers to the reference numerals included in the following figures, in which features depicted in multiple figures are designated with consistent reference numerals.

The figures depict various aspects of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

I. Example System and Related Functionality

Figure 1A:
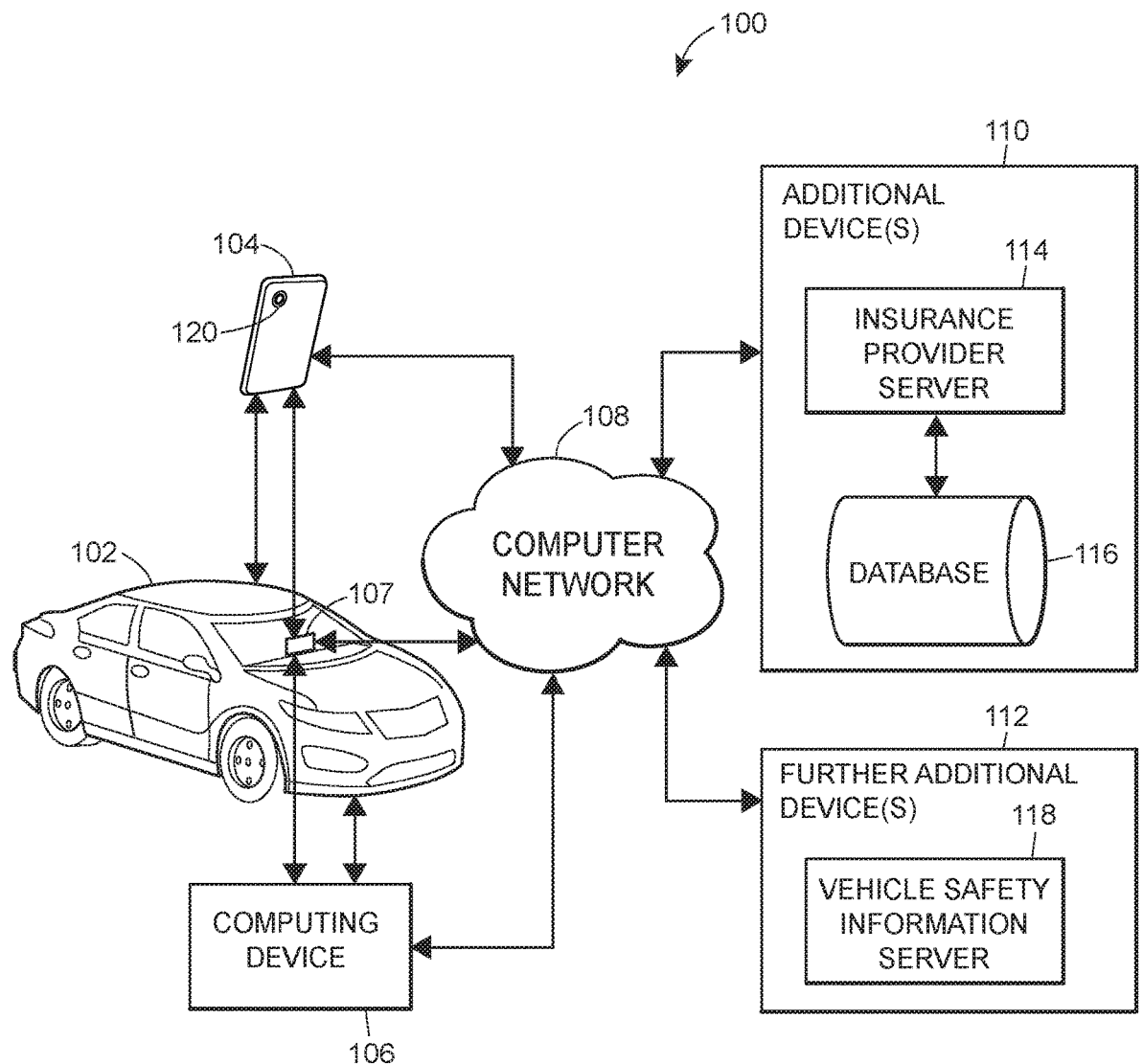
FIG. 1A illustrates an example system for receiving vehicle safety information.

FIG. 1A illustrates an example system 100 for receiving vehicle safety information. The example system 100 may include a vehicle 102, a mobile phone 104 (e.g., a mobile phone of a user of functionality of the example system 100 described herein), a computing device 106 (e.g., a computing device of the user), a vehicle information system 107

(e.g., an in-vehicle infotainment system mounted on a dashboard of the vehicle 102, as shown in FIG. 1), a computer network 108, at least one additional device 110, and at least one further additional device 112. In the example system 100, the at least one additional device 110 may include an insurance provider server 114 and a database 116, and the at least one further additional device 112 may include a vehicle safety information server 118. The insurance provider server 114 may be a server of or associated with an insurance provider (e.g., provided or used by an insurance provider, or use of which the insurance provider otherwise controls or facilitates). The insurance provider may be associated with the vehicle 102. For example, the insurance provider may be associated with the vehicle 102 because a prospective purchaser of the vehicle 102 may apply for insurance coverage for the vehicle 102 from the insurance provider, or because an owner of the vehicle 102 may already have insurance coverage for the vehicle 102 from the insurance provider.

The database 116 may store data relating to parties insured by the insurance provider associated with the insurance provider server 114, such as vehicle identification numbers (VINs) for the insured parties, which may be utilized as further described below. The database 116 may also or alternatively store data relating to parties that are prospective vehicle purchasers, such as a party that is a prospective purchaser of the vehicle 102 and that is not insured by the insurance provider. Furthermore, the database 116 may additionally or alternatively store any suitable vehicle safety information for use (e.g., retrieval) by the vehicle safety information server 118, such as information regarding recalls, safety ratings, etc. The vehicle safety information may be safety information associated with the vehicle 102, and may be utilized as further described below. In some embodiments, multiple databases 116 may be implemented even though a single database 116 is shown in FIG. 1A. In some examples, one or more such databases 116 may store data relating to insured parties and/or parties that are prospective vehicle purchasers (and not insured by the insurance provider), and one or more such databases 116 (which may be the same or different from the database(s) storing data relating to insured parties and/or parties that are prospective vehicle purchasers) may store suitable vehicle safety information. The database(s) 116 may be any suitable database(s) or data storage mechanism(s) (e.g., one or more hard disk drives, optical storage drives, solid state storage devices, etc.).

As further shown in the example of FIG. 1A, and as further discussed below, the mobile phone 104 may include an image capturing component, such as a camera 120, which may be used to capture an image of the vehicle 102. As such, the mobile phone 104 and the vehicle 102 are shown as being communicatively coupled to and from one another in FIG. 1A. While not shown in FIG. 1A, the computing device 106 may include an image capturing component (e.g., similar to the camera 120) or may otherwise be configured to receive identifying information associated with the vehicle 102 (e.g., by allowing suitable user input via a user interface of the computing device 106), which identifying information may be utilized as further described below. Thus, the computing device 106 and the vehicle 102 are also shown as being communicatively coupled to and from one another in FIG. 1A. It should be appreciated that the mobile phone 104 may also or alternatively be configured to receive identifying information associated with the vehicle 102 in a manner other than via use of the image capturing component (e.g., camera 120), such as via suitable user input. Similarly, the vehicle information system 107 may also or alternatively be configured to receive identifying information associated with the vehicle 102, such as via suitable user input. In another embodiment, the vehicle information system 107 may also or alternatively be configured to receive identifying information associated with the vehicle 102 by receiving such identifying information from the mobile phone 104 and/or the computing device 106 upon such identifying information being received by the mobile phone 104 and/or the computing device 106.

Although the example system 100 shows one vehicle 102, one mobile phone 104, one computing device 106, one vehicle information system 107, one computer network 108, one insurance provider server 114, one database 116, and one vehicle safety information server 118, the example system 100 may include more than one instance of one or more of these components. Additionally or alternatively, the example system 100 may not include one or more of the components illustrated in FIG. 1A. Furthermore, the example system 100 may include different configurations of one or more of the components illustrated in FIG. 1A. For example, in one embodiment, the functionality described herein as being provided by the insurance provider server 114, the database 116, the vehicle safety information server 118, and in some cases, at least one additional computing device (e.g., an additional server) (not shown in FIG. 1A) may all be included in the functionality provided by the at least one additional device 110. In such an embodiment, the at least one further additional device 112 may not be present.

Additionally or alternatively, the functionality provided by an additional computing device(s) such as an additional server (not shown in FIG. 1A) may be included in the functionality provided by the at least one further additional device 112, and consequently the at least one further additional device 112 may be present. Moreover, in such an embodiment (among other embodiments), one or more of the insurance provider server 114, the database 116, and/or the vehicle safety information server 118, for example, need not be implemented as physically distinct components. For example, the insurance provider server 114 and the vehicle safety information server 118 may be implemented as a single computing device that constitutes an insurance provider and vehicle safety information server, and/or the database 116 may be implemented as suitable data storage included in one or more of the insurance provider server 114 and/or the vehicle safety information server 118. As will be appreciated from the teaching and disclosure herein, such configurations (and any of a number of other possible configurations) may affect the manner in which information such as safety information associated with the vehicle 102 is, for example, accessed and transmitted to the mobile phone 104, the computing device 106, and/or the vehicle information system 107.

As another example, the example system 100 may include one or more of, but less than all of, the mobile phone 104, the computing device 106, or the vehicle information system 107. Furthermore, while each of the mobile phone 104, the computing device 106, the vehicle information system 107, the at least one additional device 110, and the at least one further additional device 112 is shown as being communicatively coupled to the computer network 108, other arrangements may be implemented. For example, in some embodiments, the vehicle information system 107 may communicate with the computer network 108 via the mobile phone 104 and/or the computing device 106. Additionally, for example, suitable communication between devices that constitute the at least one additional device 110 and/or the at least one further additional device 112 may be implemented.

As one example, the database(s) 116 may be directly coupled to the insurance provider server 114 (as shown in FIG. 1A) and/or the vehicle safety information server 118 (not shown in FIG. 1A).

Still further, it will be appreciated from the teaching and disclosure herein that one or more components of the example system 100 may, in various embodiments, not perform or implement one or more functions described with respect to such component(s). As such, in various embodiments, one or more components of the example system 100 may be configured to perform various actions, but may perform less than all of such various actions.

Figure 1B:
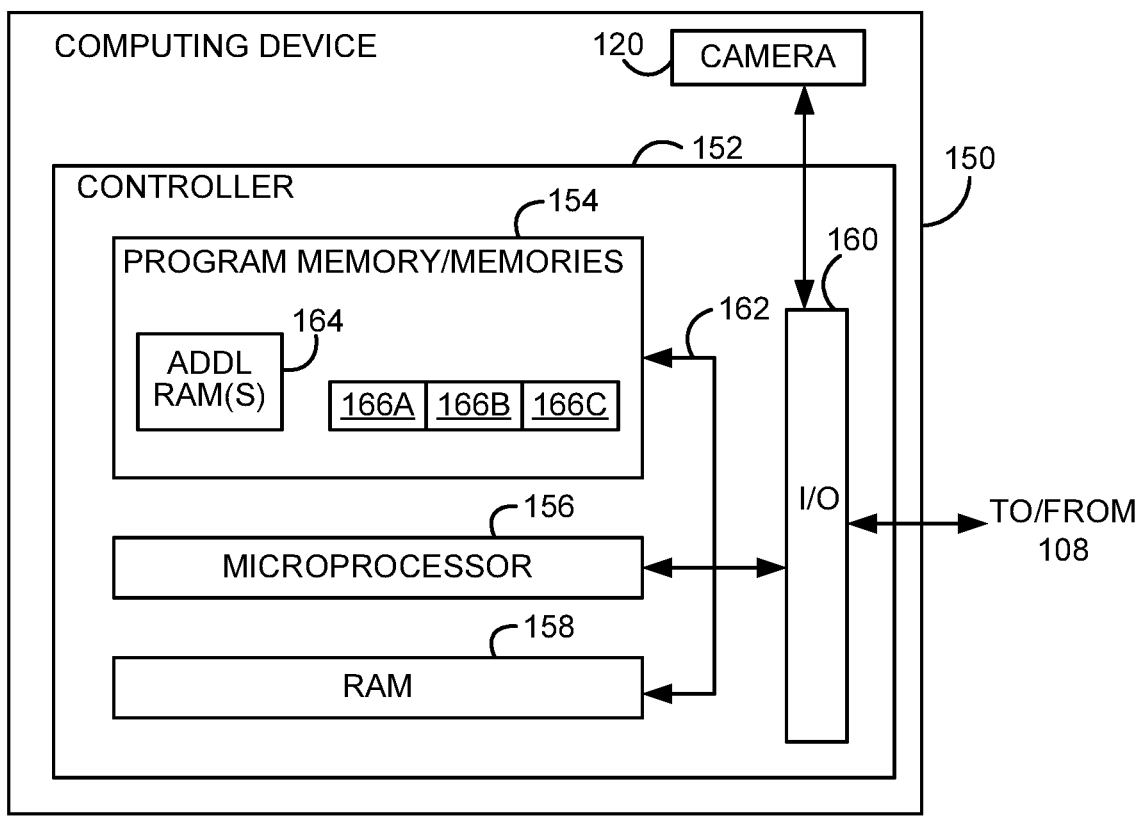
FIG. 1B illustrates an example computing device and components thereof that may be used in implementing, for example, various devices of the example system of FIG. 1A.

Referring now to FIG. 1B, an example computing device 150 and components thereof are illustrated. The example computing device 150 and components thereof may be used in implementing, for example, one or more of the mobile phone 104, the computing device 106, the vehicle information system 107, the insurance provider server 114, and/or the vehicle safety information server 118. In the example shown in FIG. 1B, the computing device 150 may include the camera 120 and a controller 152. The controller 152 may include a program memory 154, a microcontroller or a microprocessor 156, a random-access memory (RAM) 158, and an input/output (I/O) circuit 160, all of which may be interconnected via an address/data bus 162. The camera 120 (e.g., when the example computing device 150 is implemented as the mobile phone 104) may be connected to the I/O circuit 160 to provide image data (e.g., a captured image of the vehicle 102) to the I/O circuit 160 for processing by, for example, the microprocessor 156 as further described below. A similar camera may be included in the computing device 106 and may be similarly connected to the I/O circuit 160 to provide, for example, a captured image of the vehicle 102 when the example computing device 150 is implemented as the computing device 106. The program memory 154 may store computer-executable instructions, which may be executed by the microprocessor 156.

It should be appreciated that although FIG. 1B depicts only one microprocessor 156, the controller 152 may include multiple microprocessors 156. Similarly, the program memory 154 of the controller 152 may include additional RAM(s) 164 and multiple program memories storing, for example, modules, routines, and/or instructions for multiple corresponding applications 166A, 166B, and 166C (or any suitable number of applications), according to the particular configuration of the controller 152 and the computing device 150. Such modules, routines, and/or instructions, etc. may be used in performing various operations for receiving vehicle safety information, such as example operations as described herein.

Additionally, although FIG. 1B depicts the I/O circuit 160 as a single block, the I/O circuit 160 may include a number of different types of I/O circuits (not depicted). The RAM(s) 158, 164 and the program memory/memories storing, for example, instructions for the applications 166A, 166B and 166C, may be implemented in any known form of non-transitory computer readable storage media, including but not limited to semiconductor memories, magnetically readable memories, and/or optically readable memories. It should also be appreciated that the example computing device 150 may include additional, fewer, or alternate components.

In some embodiments, the instructions for, for example, the applications 166A, 166B, and 166C stored in the program memory/memories may include instructions for one or more of a general vehicle recognition application or an insured party vehicle recognition application. For purposes of explanation, the present disclosure will refer to the application 166A as the general vehicle recognition application (i.e., will refer to the general vehicle recognition application as the general vehicle recognition application 166A), and will refer to the application 166B as the insured party vehicle recognition application (i.e., will refer to the insured party vehicle recognition application as the insured party vehicle recognition application 166B). In various embodiments, the module(s), routine(s), and/or instruction(s) for the application 166C may be, for example, modules, routines, and/or instructions for any other suitable application executable by the example computing device 150. Additionally, in various embodiments, different one(s) of the applications 166A-C may correspond to the general vehicle recognition application and/or the insured party vehicle recognition application. Furthermore, in various embodiments, one or more of the mobile phone 104 or the computing device 106 may store modules, routines, and/or instructions, etc. for executing the general vehicle recognition application 166A and/or the insured party vehicle recognition application 166B. It will be appreciated that when the example computing device 150 is implemented as the mobile phone 104 (e.g., a smart phone), the general vehicle recognition application 166A and/or the insured party vehicle recognition application 166B may be implemented in the same or a similar manner as when the example computing device 150 is implemented as the computing device 106 (e.g., one or more of the applications 166A or 166B may be configured for execution by the computing device 106 instead of by the mobile phone 104).

With continued reference to FIG. 1B, and referring also to FIG. 1A, the general vehicle recognition application 166A may be made available to any user of the functionality of the example system 100. The insured party vehicle recognition application 166B may be similar to the general vehicle recognition application 166A but include additional capabilities made available to a party insured by the insurance provider associated with the insurance provider server 114, as further described below. The insured party vehicle recognition application 166B may be provided to the insured party (e.g., made available for download to the mobile phone 104 from the insurance provider server 114 via the computer network 108) when the insured party becomes insured by (e.g., obtains a policy issued by) the insurance provider. As noted above, the mobile phone 104 and/or computing device 106 (each of which may be, for example, an implementation of the example computing device 150) may include an image capturing component, such as, for example, the camera 120 and/or a camera of the computing device 106, to capture an image (e.g., photograph) of the vehicle 102 for use in implementing the functionality of the example system 100, as further described below. For example, with further reference to the discussion above, the image capturing component (e.g., the camera 120) may be in communication with the general vehicle recognition application 166A and/or the insured party vehicle recognition application 166B by way of the I/O circuit 160 (e.g., so that one or more captured images may be used by the general vehicle recognition application 166A and/or the insured party vehicle recognition application 166B, as further described below).

With further reference to FIG. 1A, the mobile phone 104 may be any suitable mobile phone, such as but not limited to a smart phone, for example. The computing device 106 may be any suitable computing device, such as but not limited to a desktop computer, a laptop computer, a tablet, a phablet, a second mobile phone, smart glasses, other wearable computing device(s), etc. The vehicle information system 107 may also be or include any suitable computing device, such as but not limited to a tablet, a phablet, etc. The computer network 108 may be or may include a computer network of the insurance provider (e.g., provided or used by the insurance provider or communications over which the insurance provider otherwise controls or facilitates). In various embodiments, processors of the devices communicatively coupled to the computer network 108 may execute instructions to transmit data to, receive data from, or otherwise communicate with other ones of the devices communicatively coupled to the computer network 108, as further described below. In various embodiments, such communication may include, but not be limited to, transmitting and/or receiving data within the context of one or more of the applications 166A and/or 166B. The computer network 108 may be or may include a network such as the Internet and/or any other type of suitable network (e.g., a local area network (LAN), a metropolitan area network (MAN), a wide area network (WAN), a mobile network, a wired or wireless network, a private network, a virtual private network, etc.). The computer network 108 may also or alternatively be or include one or more cellular networks such as code division multiple access (CDMA) network, GSM (Global System for Mobile Communications) network, WiMAX (Worldwide Interoperability for Microwave Access) network, Long Term Evolution (LTE) network, etc.

As further described below, the example system 100 allows a user computing device (or user computing devices) (e.g., the mobile phone 104, the computing device 106, and/or the vehicle information system 107) to communicate with components such as the insurance provider server 114 and/or the vehicle safety information server 118 (and, in some cases, the database 116) to receive and/or provide identifying information associated with the vehicle 102 and/or safety information associated with the vehicle 102. The identifying information associated with the vehicle may include at least one of information indicating a make of the vehicle 102, information indicating a model of the vehicle 102, information indicating a year of the vehicle 102, or information indicating a vehicle identification number (VIN) of the vehicle 102. The vehicle 102 may at times be referred to herein as the "first vehicle 102" or "first vehicle," with example embodiments in which another vehicle(s) has different associated safety information also being discussed herein.

Safety information associated with the vehicle 102 and/or another vehicle(s) (safety information associated with the vehicle 102 and/or another vehicle(s) at times being referred to herein as "vehicle safety information") may be accessed and received via the vehicle safety information server 118. For example, the vehicle safety information server 118 may host or may be communicatively coupled to an additional computing device(s) (e.g., a server) (not shown in FIG. 1A) that hosts the <http://www.safercar.gov> web site or another suitable web site through which safety information associated with the vehicle 102 or another vehicle(s) may be obtained. The safety information associated with the vehicle 102 (or another vehicle(s)) may include, for example, at least one of: (i) information indicating whether at least one recall is associated with the vehicle 102, (ii) information indicating whether at least one investigation (e.g., at least one open investigation) is associated with the vehicle 102, (iii) information indicating whether at least one other vehicle is determined via the at least one additional device 110 to have at least one of a less severe recall status as compared to the vehicle 102 (with examples of a less severe recall status being provided below) or a higher safety rating (e.g., more stars in the NHTSA five-star safety rating) as compared to the vehicle 102, or (iv) information indicating that the user of the user computing device is to provide further identifying information associated with the vehicle 102 to a remote computing device (e.g., a device that is or is included in the at least one additional device 110, or another remote device) via a user interface of the user computing device so as to receive further safety information associated with the vehicle 102 from the remote computing device. Such further identifying information may, for example, be one or more of the example types of identifying information noted above that is not included in the identifying information that is (initially) received and/or provided, and/or any other suitable type of identifying information. Such further safety information may, for example, be safety information that is the same as one or more of the examples (i)-(iii) of the safety information associated with the vehicle 102 described above and that is not included in the (initially) received safety information, and/or any other suitable type of safety information.

With reference to example (iii) of the safety information above, in some embodiments, at least one other vehicle may be determined via the at least one additional device 110 to have a less severe recall status and/or a higher safety rating as compared to the vehicle 102 by way of, for example, a determination made by and/or using one or more of the insurance provider server 114 (e.g., based on information received from the vehicle safety information server 118), the database 116, and/or the vehicle safety information server 118. Additionally or alternatively, in some embodiments, the at least one other vehicle may be determined to have a less severe recall status as compared to the vehicle 102 if, for example, the at least one other vehicle has fewer recalls, fewer recalls that are considered or classified as recalls associated with defects that relate to motor vehicle safety (or "safety defects") as described in 49 CFR § 579.4 and 49 U.S.C. § 30102(a), etc. Each of 49 CFR § 579.4 and 49 U.S.C. § 30102(a) is hereby incorporated by reference herein in its entirety for all purposes.

For example, the at least one other vehicle may have the same number of overall recalls, but may have fewer recalls associated with (e.g., resulting from) safety defects (defects relating to motor vehicle safety), and may have more recalls associated with other defects not considered safety defects. As is known, a "defect" as defined in 49 U.S.C. § 30102(a) "includes any defect in performance, construction, a component, or material of a motor vehicle or motor vehicle equipment." As is also known, "motor vehicle safety" as defined in 49 U.S.C. § 30102(a) "means the performance of a motor vehicle or motor vehicle equipment in a way that protects the public against unreasonable risk of accidents occurring because of the design, construction, or performance of a motor vehicle, and against unreasonable risk of death or injury in an accident, and includes nonoperational safety of a motor vehicle."

Several embodiments of the receiving and/or providing of the identifying information associated with the vehicle 102 and/or the safety information associated with the vehicle 102 are now described in greater detail. The user computing device (or user computing devices (e.g., the mobile phone 104, the computing device 106, and/or the vehicle information system 107)) may determine (e.g., based on information provided to the user computing device) whether the identifying information associated with the vehicle 102 is to be transmitted to the at least one additional device 110. Information provided to the user computing device may be image information corresponding to an image of the vehicle 102 captured by an image capturing component (e.g., the camera 120 or a similar camera) of the user computing device, other information (which may be or include at least some of the identifying information associated with the vehicle 102) provided to the user computing device by a user (e.g., via a component(s) of a user interface of the user computing device not including the camera 120), information provided to the user computing device via the computer network 108 (e.g., from the at least one additional device 110), and/or any other suitable information. Where the information provided to the user computing device is or includes an image of the vehicle 102, such information may be provided from the camera 120, for example, for processing by the general vehicle recognition application 166A and/or the insured party vehicle recognition application 166B as further discussed herein before any transmission of the identifying information associated with the vehicle 102 to the at least one additional device 110. Example techniques for determining (e.g., based on information provided to the user computing device) whether the identifying information associated with the vehicle 102 is to be transmitted to the at least one additional device 110 are further discussed below.

In some embodiments, as further discussed below, the general vehicle recognition application 166A may advantageously be programmed to identify the make and model of the vehicle 102 based on the image captured by the image capturing component (e.g., an image of a rear of the vehicle 102 captured by the camera 120), and in particular based on a comparison of the image or attributes thereof to known data regarding a number of vehicles, such as a suitable aggregation of vehicle data. Such known data regarding a number of vehicles may be obtained by the general vehicle recognition application 166A through, for example, a suitable external web site, such as <http://www.edmunds.com>. For example, the mobile phone 104 and/or computing device 106 executing the general vehicle recognition application 166A may ping or otherwise connect to a server (which need not be one of the servers shown in FIG. 1A) hosting such an external web site in order to compare attributes of the captured image to the known data regarding a number of vehicles. The general vehicle recognition application 166A may also advantageously be programmed to estimate the year of the vehicle 102 (e.g., to estimate the year within a range of years) based on the image captured by the image capturing component and comparison to the known data. In this manner, at least some of the aforementioned examples of identifying information associated with the vehicle 102 may be determined and may include, in such embodiments, information indicating a make of the vehicle 102, information indicating a model of the vehicle 102, and information indicating a year of the vehicle 102 (e.g., indicating the year of the vehicle 102 by way of being an estimate of the year of the vehicle 102). In some examples, the general vehicle recognition application 166A may be the CarCapture® app.

Based on the identification and estimation of these attributes of the vehicle 102, the general vehicle recognition application 166A may provide the user of the example system 100 (e.g., a user of the user computing device(s), such as a user of the mobile phone 104 and/or the computing device 106) with the safety information associated with the vehicle 102. For example, such identifying information associated with the vehicle 102 may be provided to (e.g., may be used to query) the vehicle safety information server 118 to, for example, cause the vehicle safety information server 118 to ping a web site, such as <http://www.safercar.gov>, and as a more particular example, <http://www-odi.nhtsa.dot.gov/owners/SearchSafetyIssues>, to obtain the vehicle safety information. Such safety information, and/or any options to, for example, use the image capturing component(s) to receive identifying information associated with the vehicle 102, may be provided as additional options and/or output in the application(s) 166A and/or 166B executed by the mobile phone 104 and/or the computing device 106. In another embodiment, such safety information may additionally or alternatively be provided via a user interface of the vehicle information system 107. In some examples, safety information as discussed herein may be received by the mobile phone 104 and/or the computing device 106 and provided from the mobile phone 104 and/or the computing device 106 to the vehicle information system 107. In other examples, safety information as discussed herein may be received by the vehicle information system 107 and provided to the mobile phone 104 and/or the computing device 106.

As noted above, the safety information associated with the vehicle 102 may in some cases include information indicating that the user of the user computing device(s) (e.g., the mobile phone 104, the computing device 106, and/or the vehicle information system 107) is to provide further identifying information associated with the vehicle 102 to a remote computing device. For example, such safety information may include instructions to the user to use the user computing device to visit a web site, such as <http://www.safercar.gov>, to input additional information (e.g., to input the exact year of the vehicle 102 to a remote computing device, such as the vehicle safety information server 118, that hosts <http://www.safercar.gov>) in order to obtain more complete safety information associated with the vehicle 102. Thus, the user computing device may be configured to receive the further identifying information, and to transmit the further identifying information to the at least one additional device 110 (which, as noted above, may in various embodiments include, for example, the insurance provider server 114, the database 116, and/or the vehicle safety information server 118) and/or the at least one further additional device 112. The user computing device may thus also be configured to receive the further safety information based on the further identifying information.

In some embodiments, the vehicle safety information may instruct the user to call or otherwise contact the manufacturer of the vehicle 102 for further recall information, such as information regarding the particular year(s) subject to an active recall. Additionally or alternatively, the vehicle safety information provided via the general vehicle recognition application 166A may directly include such information regarding contacting the manufacturer of the vehicle 102, and/or regarding particular years that are subject to an active recall. Generally speaking, the vehicle safety information may include any suitable information retrievable from the web site (e.g., <http://www.safercar.gov>).

In other embodiments, the insured party vehicle recognition application 166B may advantageously obtain the VIN of the vehicle 102 by use of the image capturing component where the user of the user computing device is an insured party. In such embodiments, the insured party vehicle recognition application 166B may, for example, implement suitable character recognition techniques where the image is of the VIN. In some embodiments, the general vehicle recognition application 166A may also or alternatively be configured to implement such character recognition with respect to an image of the VIN. Furthermore, in some embodiments, the application(s) 166A and/or 166B may also or alternatively be configured to prompt the user of the user computing device to operate the image capturing component(s) to capture the image of the VIN (e.g., to use the camera 120 to take a picture of the VIN).

The insured party vehicle recognition application 166B may also advantageously obtain the VIN of the vehicle 102 from, for example, memory of the user computing device. In this example, the VIN may be stored in memory as a result of user input to the user computing device, for example. In still other embodiments, the insured party vehicle recognition application 166B may also advantageously be caused to obtain the VIN of the vehicle 102 via the computer network 108 from the at least one additional device 110 (e.g., from the insurance provider server 114 or from the database 116). For example, the insurance provider may cause the insurance provider server 114 to transmit the VIN via the computer network 108. In some embodiments, the insured party vehicle recognition application 166B may be the Pocket Agent® app.

Based on the VIN, the insured party vehicle recognition application 166B may provide the user with the safety information associated with the vehicle 102 in a similar way as described above with respect to the general vehicle recognition application 166A. In one embodiment, vehicle safety information provided through the insured party vehicle recognition application 166B may not include instructions to call the manufacturer of the vehicle 102 where the exact identification of the vehicle by way of, for example, the VIN, allows determination of any needed information regarding, for example, active recalls. In another embodiment, the vehicle safety information provided through the insured party vehicle recognition application 166B may instruct the user to provide the VIN to the insured party vehicle recognition application 166B (e.g., by entering or otherwise providing the VIN via a user interface of the user computing device), or to enter the VIN directly into the web site, as an added check that the VIN that is, for example, stored in memory of the user computing device is correct. Upon determination of a match and/or retrieval of the vehicle safety information using the user-entered VIN, the insured party vehicle recognition application 166B may provide the user with the vehicle safety information.

The application(s) 166A and/or 166B may be application(s) that have other existing functionality. For example, with reference to the discussion above, the insured party vehicle recognition application 166B may be an application provided to an insured party that may include and/or provide access to all or a subset of relevant information regarding the insured party's insurance policy with the insurance provider, with such information including the VIN for the vehicle 102, for example. In one embodiment, the insured party vehicle recognition application 166B may already provide additional functionality such as the ability for the user (e.g., insured party) to electronically view an insurance card, submit a claim, request roadside assistance, contact the user's insurance agent, locate any insurance agent of the insurance provider, and/or any suitable additional functionality. Thus, as noted above, vehicle safety information, and/or any options to, for example, use the image capturing component(s) to receive identifying information associated with the vehicle 102, may be provided as additional options and/or output in the application(s) 166A and/or 166B.

The user computing device (or user computing devices (e.g., the mobile phone 104, the computing device 106, and/or the vehicle information system 107)) may receive, in response to a determination via the at least one additional device 110 that the safety information associated with the vehicle 102 is to be provided to the user computing device, the safety information associated with the vehicle 102 via the computer network 108. The determination via the at least one additional device 110 may be, for example, a determination made by and/or using one or more of the insurance provider server 114, the database 116, and/or the vehicle safety information server 118.

The determination via the at least one additional device 110 that the safety information associated with the vehicle 102 is to be provided to the user computing device may be based on information available at the at least one additional device 110. For example, this determination may be made based on information available at one or more of the insurance provider server 114, the database 116, and/or the vehicle safety information server 118. In some embodiments, the determination via the at least one additional device 110 that the safety information associated with the vehicle 102 is to be provided to the user computing device may be made based on the identifying information associated with the vehicle 102 (which may have been transmitted via the computer network 108 after, for example, an image capture as described above; which may be stored at the at least one additional device 110 such as at the insurance provider server 114; etc.). In some embodiments, the determination via the at least one additional device 110 that the safety information associated with the vehicle 102 is to be provided to the user computing device may also or alternatively be made based on information indicating whether a particular amount of time has passed since the safety information associated with the vehicle 102 was last provided to the user computing device (e.g., where the particular amount of time may be a predetermined or threshold time set by, for example, the insurance provider and stored in the database 116, and where whether the particular amount of time has passed may be determined by the insurance provider server 114). The determination via the at least one additional device 110 that the safety information associated with the vehicle 102 is to be provided to the user computing device may also or alternatively be based on information indicating that the safety information associated with the first vehicle 102 has been updated. Where the at least one additional device 110 includes the insurance provider server 114 but does not include the vehicle safety information server 118, for example, such information may, in one example, be provided from the vehicle safety information server 118 to the insurance provider server 114 (e.g., via the computer network 108).

The safety information associated with the vehicle 102 may be provided to the user computing device by the at least one additional device 110 accessing the safety information associated with the vehicle 102 and transmitting the safety information associated with the vehicle 102 via the computer network 108 to the user computing device so that the safety information associated with the vehicle 102 is made available to a user of the user computing device. For example, the safety information associated with the vehicle 102 may be viewable by and/or otherwise provided to the user, such as via a user interface; and/or able to be responded to by the user via a user interface (e.g., by the user being able to provide further identifying information associated with the vehicle 102), etc. In one example of the at least one additional device 110 accessing the safety information associated with the vehicle 102 and transmitting such safety information via the computer network 108 to the user computing device so that such safety information is made available to the user, the at least one additional device 110 may access such safety information from data storage included in one or more of the at least one additional device 110 or the at least one further additional device 112 (which may, as noted above, include the vehicle safety information server 118).

More particularly, in one example, the at least one additional device 110 may include the insurance provider server 114 of the insurance provider associated with (e.g., providing insurance coverage with respect to) the vehicle 102. The insurance provider server 114 may be configured to access the safety information from the at least one further additional device 112, where the at least one further additional device 112 includes the vehicle safety information server 118. The safety information associated with the vehicle 102 may be provided by a party other than each of (e.g., distinct from each of) the insurance provider, a prospective purchaser of the vehicle 102 (with situations involving a prospective purchaser being further discussed below), and an owner of the vehicle 102 (with situations involving an owner also being further discussed below). For example, the safety information associated with the vehicle 102 may be provided by a party that is an administrator of the web site <http://www.safercar.gov>.

As a result of the advantageous identification of the vehicle 102 using, for example, the attributes discussed above with respect to the general vehicle recognition application 166A, or using, for example, the VIN as discussed above with respect to the insured party vehicle recognition application 166B, an owner or prospective purchaser of the vehicle 102 may more readily know whether the vehicle 102 is subject to one or more active recalls, investigations, and/or has comparable vehicle models with less severe recall statuses (such as described above) and/or higher safety ratings (such as described above), for example. For example, the owner or prospective purchaser of the vehicle 102 may know such information without having to visit <http://www.safercar.gov> or a similar web site and enter information regarding the vehicle 102 into such a web site, or may be guided to such a web site and need to enter only a portion of the information previously required to be entered (e.g., the year of the vehicle 102 when the year is estimated as described above). As such, among other advantages, the systems and methods described herein are directed to an improvement to computer functionality, and improve the functioning of conventional computers. For example, the application 166A, and/or the application 166B, acting in concert with various structures of the system 100 such as the image capturing component(s) (e.g., a camera(s) such as the camera 120), the mobile phone 104, the computing device 106, the vehicle information system 107, the insurance provider server 114, the database 116, and/or the vehicle safety information server 118, for example, improve(s) the functioning of conventional computers and allow(s) improved access to and more awareness of vehicle safety information.

II. Example Methods for Receiving Vehicle Safety Information

Figure 1C:
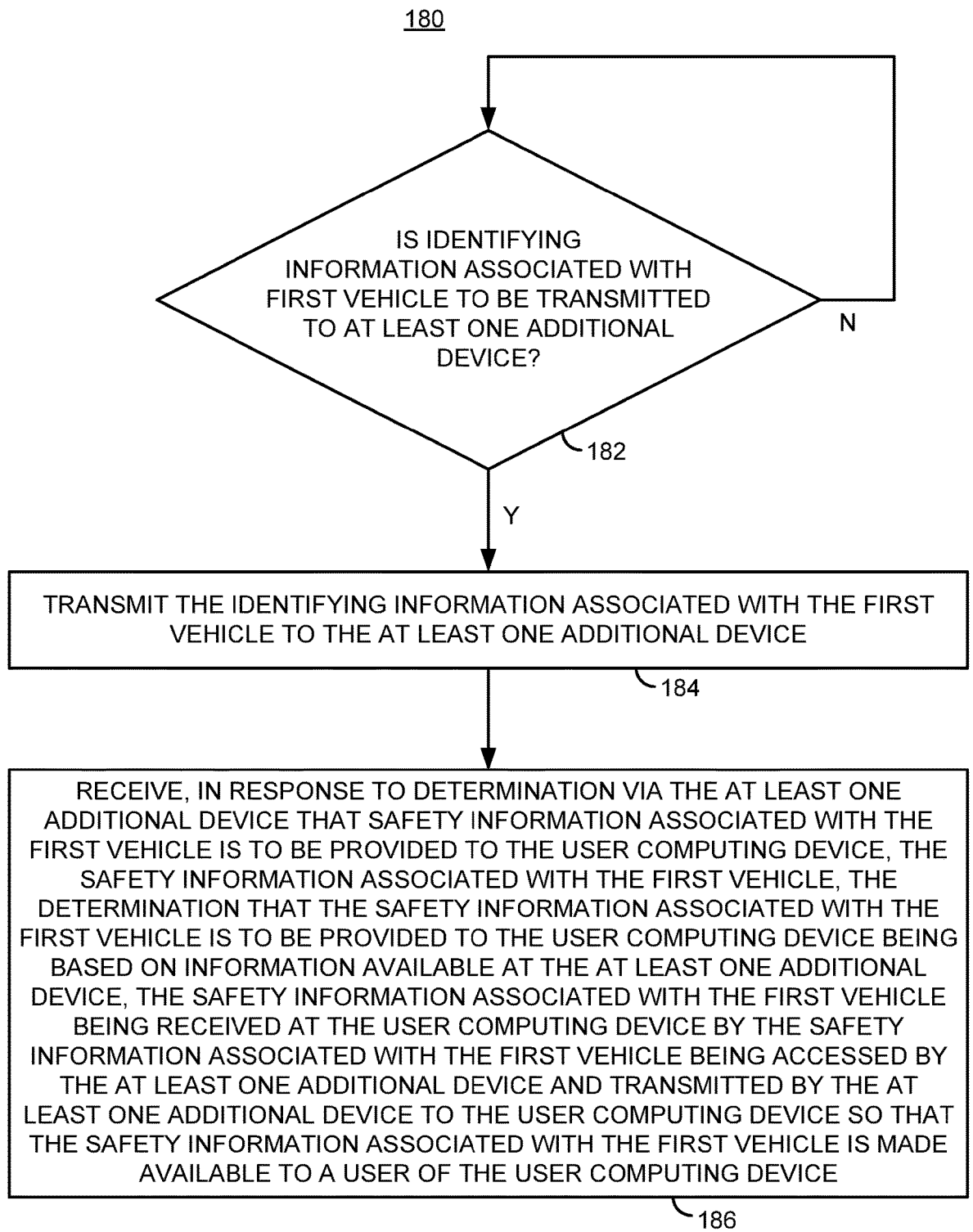
FIG. 1C is a flow chart of an example method, routine, or process for receiving vehicle safety information.

FIG. 1C is a flow chart of an example method, routine, or process 180 for receiving vehicle safety information, such as safety information associated with the vehicle 102. One or more processors, which may be one or more processors of the user computing device (or devices) (e.g., the mobile phone 104, the computing device 106, and/or the vehicle information system 107), may determine whether identifying information associated with a first vehicle (e.g., the vehicle 102 or "the first vehicle 102") is to be transmitted to at least one additional device, such as via a computer network (e.g., to the at least one additional device 110 via the computer network 108) (block 182). The identifying information associated with the first vehicle (e.g., the vehicle 102) may include at least one of information indicating a make of the vehicle 102, information indicating a model of the vehicle 102, information indicating a year of the vehicle 102, or information indicating a VIN of the vehicle 102.

The one or more processors may determine whether the identifying information associated with the first vehicle (e.g., the vehicle 102) is to be transmitted to the at least one additional device 110 in any of a number of suitable manners and/or based on any one or more suitable factors. In some embodiments, the one or more processors may determine whether the identifying information associated with the first vehicle is to be transmitted based on at least one of (i) an analysis of information provided to the user computing device, or (ii) a particular amount of time having passed since the identifying information associated with the first vehicle was last transmitted to the at least one additional device 110 via the computer network 108. More particularly, the one or more processors may, for example, determine whether the identifying information associated with the vehicle 102 is to be transmitted based on an analysis of information input to the user computing device via a user interface to determine whether the information that has been input includes any information that constitutes the identifying information associated with the vehicle 102. For example, the one or more processors may determine whether the information that has been input includes any of the aforementioned examples of the identifying information associated with the vehicle 102, and if so it may be determined that such identifying information is available at the user computing device and is to be transmitted.

In another example, the one or more processors may determine that the identifying information associated with the vehicle 102 is to be transmitted when the image capturing component (e.g., the camera 120) captures an image of the vehicle 102 as described above and the image is analyzed to determine the identifying information as described above. In yet another example, the one or more processors may determine whether the identifying information associated with the vehicle 102 is to be transmitted based on an analysis of information provided to the user computing device from another device in the example system 100, such as from the insurance provider server 114. For example, if the analysis of the information provided from the insurance provider server 114 indicates that any such information is or includes information that constitutes the identifying information associated with the vehicle 102, it may be determined that such identifying information is available at the user computing device and is to be transmitted.

In embodiments where the one or more processors determine whether the identifying information associated with the vehicle 102 is to be transmitted based on a particular amount of time having passed since the identifying information was last transmitted, the one or more processors may determine whether a predetermined or threshold amount of time (which may be user-configurable, configurable by the insurance provider, etc.), has elapsed since the identifying information was last transmitted. When the predetermined or threshold amount of time has elapsed, the most recent identifying information available at the user computing device (e.g., identifying information from an analysis of a most recently captured image, identifying information most recently input by the user via a user interface, identifying information most recently received from another device in the example system 100, etc.) may be transmitted to the at least one additional device 110. In this manner, for example, any changes to the safety information associated with the vehicle 102 that have occurred since the last transmission of identifying information may be received at the user computing device by way of, for example, another query of the vehicle safety information server 118, such as in the manner described above.

With continued reference to the actions described with respect to block 182, in some embodiments, information provided to and received at the user computing device (or devices) (which, again, may be the mobile phone 104, the computing device 106, and/or the vehicle information system 107) may be provided by the user so as to apply for and/or obtain financing (e.g., a bank loan) of a purchase of the first vehicle (e.g., the vehicle 102), as further discussed below with respect to FIG. 3. In such embodiments, the one or more processors may determine that the identifying information associated with the vehicle 102 is to be transmitted to the at least one additional device 110 (e.g., via the computer network 108) based on receiving the information provided to the user computing device so as to apply for and/or obtain such financing. By way of example, if it is determined that information provided to the user computing device is information that is requested or required as part of an application to obtain such financing, the one or more processors may determine that the most recent identifying information available at the user computing device is to be transmitted to the at least one additional device 110.

The example method, routine, or process 180 may remain at the determination described with respect to block 182 if it is determined that the identifying information associated with the first vehicle (e.g., the vehicle 102) is not to be transmitted to the at least one additional device 110. If it is determined that the identifying information associated with the first vehicle is to be transmitted to the at least one additional device 110, the one or more processors in conjunction with, for example, an I/O circuit (e.g., the I/O circuit 160 as described with respect to FIG. 1B) may transmit the identifying information associated with the vehicle 102 to the at least one additional device 110 (block 184). For example, in embodiments where the at least one additional device 110 includes the vehicle safety information server 118, the one or more processors may transmit the identifying information associated with the vehicle 102 to the vehicle safety information server 118 via the computer network 108 in order to query the vehicle safety information server 118 for safety information associated with the first vehicle 102.

The one or more processors may receive, in response to a determination via the at least one additional device 110 that the safety information associated with the first vehicle (e.g., the vehicle 102) is to be provided to the user computing device, the safety information associated with the vehicle 102 (block 186). The determination that the safety information associated with the vehicle 102 is to be provided to the user computing device may be based on information available at the at least one additional device 110. The safety information associated with the vehicle 102 may be received at the user computing device by such safety information being accessed by the at least one additional device 110 and transmitted by the at least one additional device 110 to the user computing device so that such safety information is made available to a user of the user computing device. The safety information may be one of the example types of information discussed above, and thus may include information regarding one or more additional vehicles (e.g., one or more additional vehicles with a less severe recall status as compared to the vehicle 102 (such as described above) and/or one or more additional vehicles with a higher safety rating as compared to the vehicle 102, etc., as also described above).

As discussed with respect to FIGS. 1A and 1B, in some embodiments, the determination via the at least one additional device 110 that the safety information associated with the vehicle 102 is to be provided to the user computing device may be based on at least one of the identifying information associated with the vehicle 102 (e.g., based on the identifying information corresponding to safety information stored at and/or accessible via the at least one additional device 110), information indicating whether a particular amount of time has passed since the safety information was last provided to the user computing device, or information indicating that the safety information associated with the vehicle 102 has been updated.

With continued reference to the actions described with respect to block 186, in some embodiments, as discussed above, the at least one additional device 110 may include the vehicle safety information server 118. The at least one additional device 110 may access the safety information associated with the vehicle 102 via the vehicle safety information server 118. In some examples, the at least one additional device 110 may be the vehicle safety information server 118 and may access such safety information, for example, from data storage of the vehicle safety information server 118 or from an additional computing device(s) (not shown) communicatively coupled to the vehicle safety information server 118 as described above.

With further reference to the actions described with respect to block 186, in other embodiments, the at least one additional device 110 may include the insurance provider server 114, and the at least one further additional device 112 may include the vehicle safety information server 118. The insurance provider server 114 may access the safety information associated with the vehicle 102 from the at least one further additional device 112 by accessing the safety information associated with the vehicle 102 via the vehicle safety information server 118 (e.g., from the vehicle safety information server 118 or from an additional computing device(s) (not shown) communicatively coupled to the vehicle safety information server 118, as described above).

As will be apparent from the above description, and as should be appreciated with respect to all examples presented in this disclosure, various ones of the functions or operations shown and/or described with respect to FIG. 1C are optional. Furthermore, the functions or operations shown and/or described with respect to FIG. 1C (and each flow chart herein) may be performed in any suitable order, any desired number of times, and/or with any suitable variation to the particular order and/or combination shown and/or described so as to achieve a desired result, such as a desired manner of determining vehicle safety information.

Figure 2:
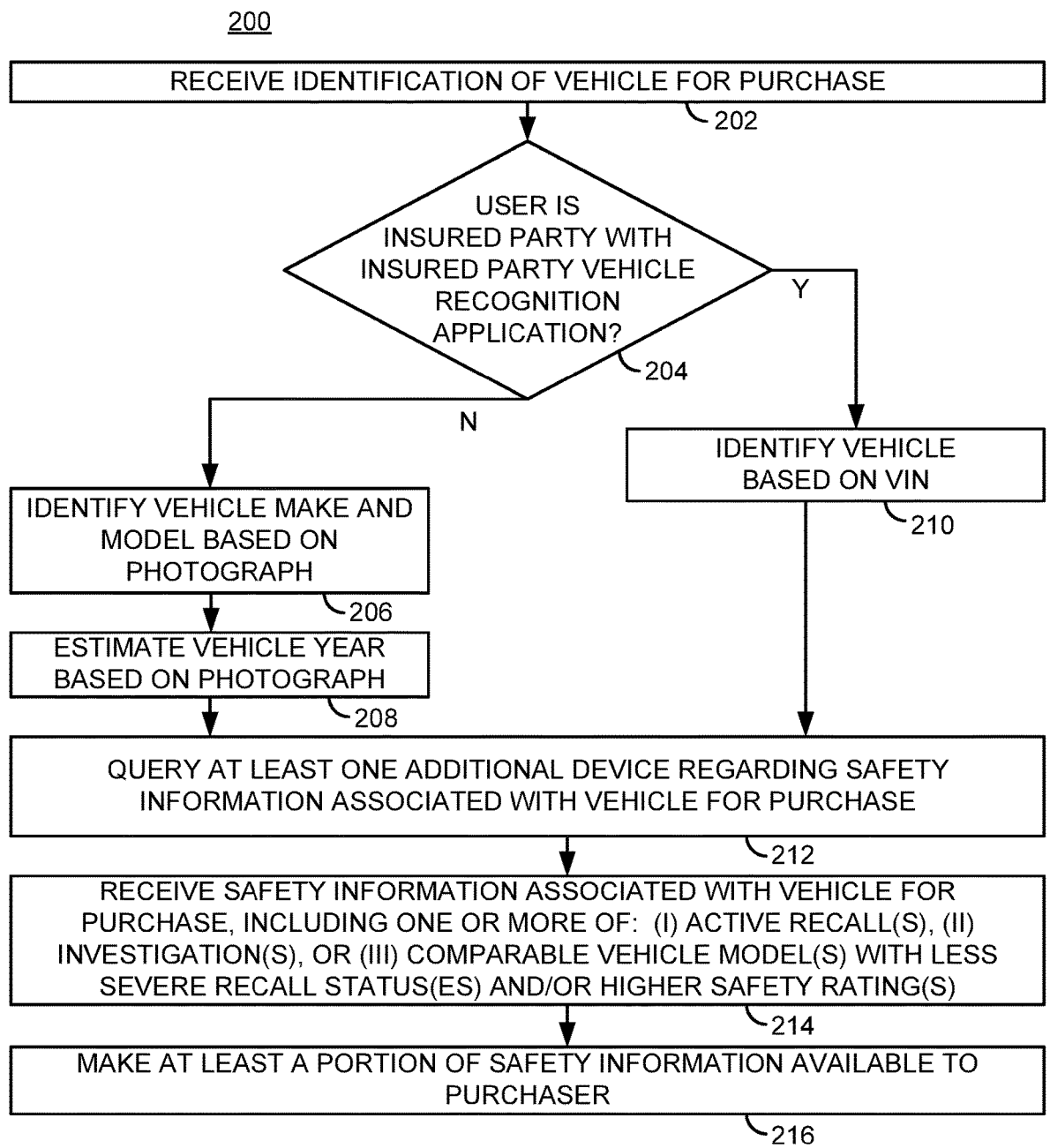
FIG. 2 is a flow chart of another example method, routine, or process for receiving vehicle safety information.

FIG. 2 is a flow chart of another example method, routine, or process 200 for receiving vehicle safety information, such as the safety information associated with the vehicle 102 (e.g., a used vehicle for prospective purchase). The example method, routine, or process 200 may also be performed when the vehicle 102 is a new vehicle for prospective purchase, it being understood that the severity of, for example, recalls for a new vehicle being sold may be lower (e.g., with reference to the discussion of safety defects above, a new vehicle may have fewer or no defects within the meaning of 49 U.S.C. § 30102(a) that are considered defects that relate to motor vehicle safety as described in 49 CFR § 579.4). One or more processors, which may be one or more processors of the user computing device (or devices) (e.g., the mobile phone 104, the computing device 106, and/or the vehicle information system 107), may receive an identification of a vehicle for purchase (e.g., the vehicle 102) (block 202). For example, the user may enter information for the user's own reference into one of the applications 166A or 166B to designate the vehicle 102 identified for purchase, or the user may otherwise enter information via, for example, a user interface of the user computing device(s) to designate the vehicle 102 identified for purchase.

The one or more processors may determine whether the user is an insured party insured with the insurance provider associated with the insurance provider server 114, and whether the user thus has the insured party vehicle recognition application 166B (block 204). If it is determined that the user does not have the insured party vehicle recognition application 166B (e.g., because the user is not an insured party), the vehicle 102 may be identified (e.g., by the one or more processors executing the general vehicle recognition application 166A) by make and model based on analysis of an image of the vehicle 102 captured by way of the user using the image capturing component (e.g., the camera 120) (block 206). A year of the model of the vehicle 102 may then be estimated by the application 166A based on analysis of the image (block 208). In another embodiment with respect to block 208, the application 166A may prompt the user to capture an image of the VIN of the vehicle 102, even though the user is not an insured party of the insurance provider. The application 166A may then use character recognition techniques to analyze the image and determine the VIN from the image. In any event, the identifying information associated with the vehicle 102 may be determined in any suitable manner, such as that described with respect to blocks 206 and 208 and/or via suitable user input via a user interface. With reference to the example method, routine, or process 180, it may be determined that the identifying information associated with the vehicle 102 is to be transmitted to the at least one additional device 110 (e.g., the vehicle safety information server 118) when image analysis is complete and the identifying information is determined.

If it is determined that the user does have the insured party vehicle recognition application 166B, the one or more processors may identify the vehicle 102 based on the VIN (block 210). In other embodiments, the VIN may already be stored in memory of the user computing device, and the identification of the vehicle 102 based on the VIN need not be carried out using the aforementioned one or more processors. In any event, the VIN may then be transmitted to the at least one additional device 110 (e.g., the vehicle safety information server 118) as described below.

From the performance of the actions described with respect to block 208 or the performance of the actions described with respect to block 210, flow may proceed to the one or more processors querying the at least one additional device 110 (e.g., by transmitting the identifying information associated with the vehicle 102 to the at least one additional device 110) regarding the safety information associated with the vehicle 102 for purchase (block 212). Thus, the at least one additional device 110 may access the safety information associated with the first vehicle 102, it being understood, as discussed above, that the at least one additional device 110 may be or include the vehicle safety information server 118, and that the safety information may be available via the vehicle safety information server 118 (e.g., on a web site such as <http://www.safercar.gov>). As such, the at least one additional device 110 may access the safety information from, for example, data storage of the vehicle safety information server 118 or from an additional computing device(s) (not shown) communicatively coupled to the vehicle safety information server 118. For example, the VIN may be sent to the vehicle safety information server 118, or the make, model, and in some cases the estimated year of the vehicle 102 may be sent to the vehicle safety information server 118, and the safety information may be accessed from such data storage or from such an additional computing device(s) (e.g., from another server hosting a web site such as <http://www.safercar.gov>).

The one or more processors may receive the safety information associated with the vehicle 102, including any one or more of the example types of safety information described above (block 214). For example, as shown in FIG. 2, the safety information associated with the vehicle 102 may include at least one of information regarding one or more active recalls associated with the vehicle 102 (which information may be limited to or otherwise prioritize recalls that are for certain problems such as safety defects, as opposed to defects or other problems considered to be less critical and thus not considered to be, for example, safety defects), one or more investigations associated with the vehicle 102, or comparable vehicle models to the model of the vehicle 102 that have less severe recall statuses and/or higher safety ratings. Safety information regarding active recalls and/or investigations may indicate, for example, that model years within a particular period are subject to an active recall or recalls, with such information being presented in some cases based on correspondence of the particular period to the estimated year of the vehicle 102. Additionally or alternatively, safety information regarding active recalls and/or investigations may more generally state that the vehicle 102 may be subject to a recall, and/or may state that the user should contact the manufacturer of the vehicle 102 for further information (and may provide a telephone number or other means of contacting the manufacturer). The web site and/or the vehicle safety information server 118 may send such information via the computer network 108 to the user computing device, in one example.

With continued reference to the actions described with respect to block 214, the safety information may in some embodiments include information regarding comparable vehicle models that have higher safety ratings if a safety rating of the make and model of the vehicle 102, such as a safety rating available on <http://www.safercar.gov>, is less than a highest rating or other suitable relative safety rating.

The one or more processors may provide a portion or all of the received safety information associated with the vehicle 102 to the user (e.g., to the prospective purchaser of the vehicle 102) via, for example, a display or other output of the user computing device (block 216). If desired, the insurance provider may also advise the prospective purchaser to check for recalls and/or, for example, to check for another vehicle with a higher safety rating (e.g., by way of information sent from the insurance provider server 114 via the computer network 108 to the user computing device) based on the safety information associated with the vehicle 102 (e.g., with the safety information associated with the vehicle 102 also being provided to the insurance provider server 114 in such an implementation).

Figure 3:
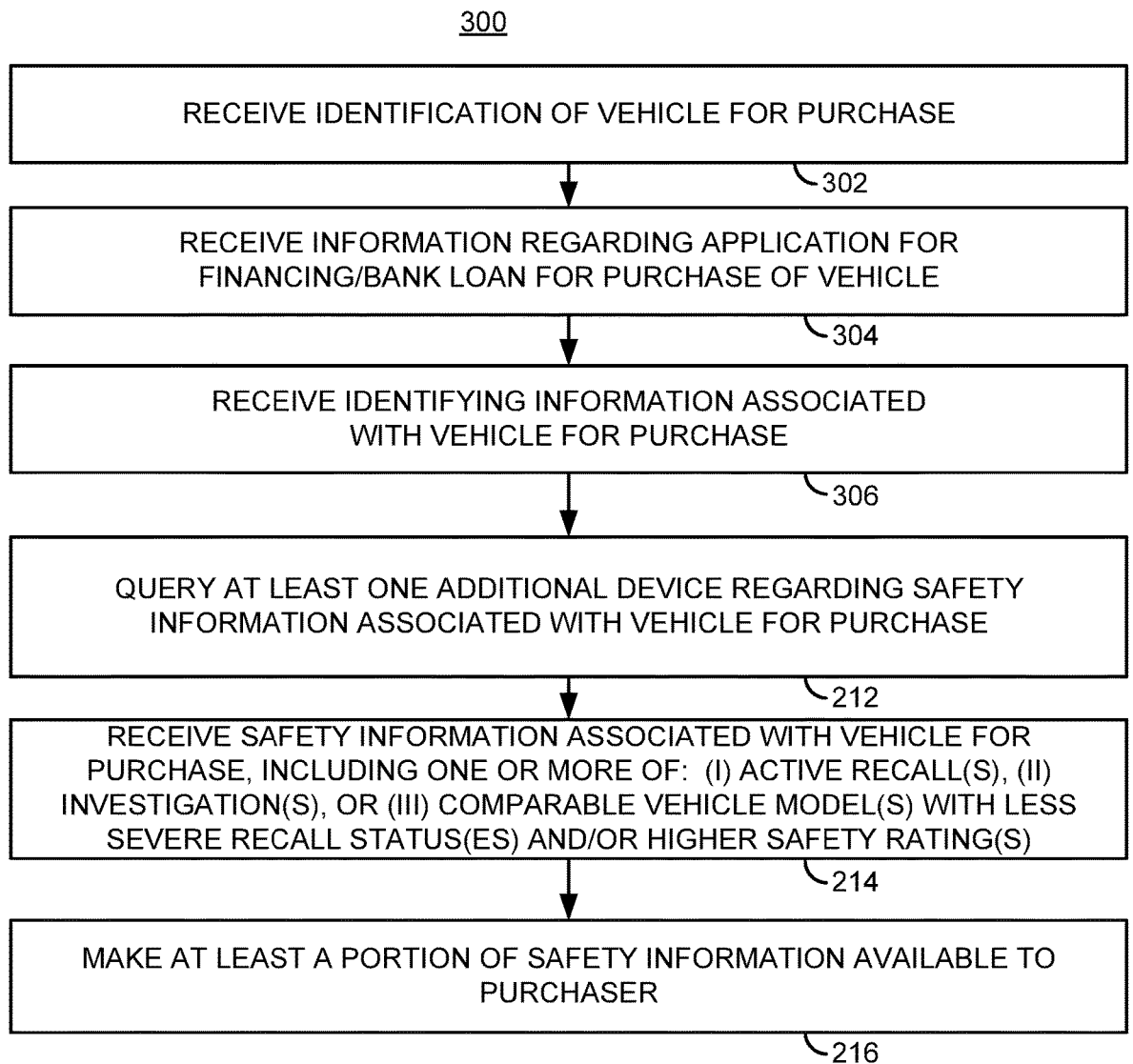
FIG. 3 is a flow chart of another example method, routine, or process for receiving vehicle safety information.

FIG. 3 is a flow chart of another example method, routine, or process 300 for receiving vehicle safety information, such as the safety information associated with the vehicle 102. More particularly, the example method, routine, or process 300 may be implemented in conjunction with a purchase of a vehicle (e.g., a used vehicle, though the example method, routine, or process may also be implemented in conjunction with purchase of a new vehicle) that involves applying for and/or obtaining financing of the purchase of the vehicle (e.g., a bank loan, such as a loan from an institution operated by or otherwise affiliated with the insurance provider).

One or more processors may receive an identification of a vehicle for purchase (e.g., the vehicle 102) (block 302). The one or more processors may be one or more processors of the user computing device (or devices) (e.g., the mobile phone 104, the computing device 106, and/or the vehicle information system 107), and the receipt of the identification of the vehicle for purchase described with respect to block 302 may be performed in the same or a similar manner as described with respect to block 202. For example, if the user is already insured (such as with respect to a different vehicle) with the insurance provider, the identification may be received from the insured party vehicle recognition application 166B. If the user is not already insured with the insurance provider, the identification may be received from the general vehicle recognition application 166A, for example. In other examples, the identification of the vehicle for purchase may be received via suitable user input via a user interface of the user computing device(s).

The one or more processors may receive information regarding, for example, an application for financing/a bank loan for the purchase of the vehicle 102 (block 304), such as via suitable user input to a user interface of the user computing device. The information regarding an application for financing/a bank loan may be, for example, any information requested or required by an application for the financing/bank loan.

The one or more processors may also receive identifying information associated with the vehicle 102 (block 306). The received identifying information may include, for example, one or more of the example types of identifying information discussed hereinabove, and thus may include the VIN and/or the make, model, and year of the vehicle 102, for example. In some embodiments, the actions described with respect to block 306 may include implementing one or more of the actions described with respect to blocks 204, 206, 208, and/or 210 (not shown in FIG. 3) in a similar manner as described with respect to FIG. 2 so as to receive the identifying information.

In another embodiment, the identifying information associated with the vehicle 102 may be received as described with respect to block 306 by performing the actions described with respect to blocks 204, 206, 208, and/or 210 before the one or more processors receive information regarding an application for financing/a bank loan as described with respect to block 304. The receiving of the identifying information performed by way of performing the actions described with respect to blocks 204, 206, 208, and/or 210 may, in some embodiments, be used to populate the information regarding the application for financing/a bank loan. Additionally or alternatively, the performing of the actions described with respect to blocks 204, 206, 208, and/or 210 may cause display—such as by way of one of the applications 166A or 166B, another suitable application, or any suitable technique—of information regarding financing the purchase of the vehicle 102 to the user of the user computing device.

The one or more processors, and/or other suitable device (s), may also perform the actions described above with respect to blocks 212, 214, and 216 based on receipt of information that has been provided by the user so as to apply for and/or obtain financing of the purchase. Thus, it will be appreciated from the teaching and disclosure herein that the one or more processors may perform the actions described above with respect to block 306, and also determine that the identifying information associated with the vehicle 102 is to be transmitted to the at least one additional device 110 and thus perform the actions described above with respect to blocks 212-216, based on a determination that information provided to the user computing device is provided so as to apply for and/or obtain financing. As discussed above, the actions described with respect to blocks 212, 214, and 216 may be performed to query the at least one additional device 110 (block 212), receive the safety information associated with the vehicle 102 (block 214), and make at least a portion of the safety information available to the user (e.g., prospective purchaser of the vehicle 102) (block 216). The safety information provided to the user may indicate whether any issue associated with an active recall has been repaired.

Figure 4:
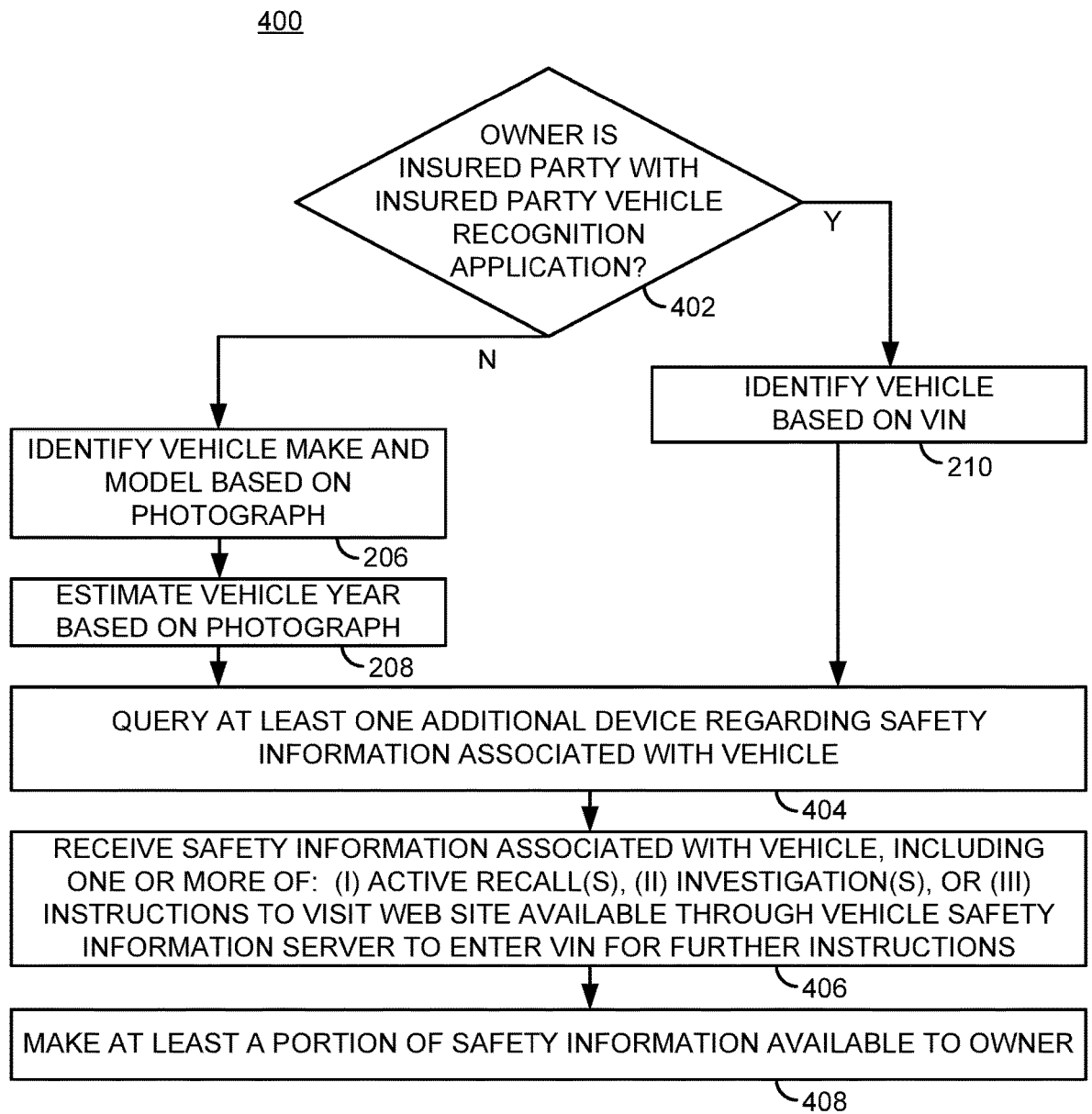
FIG. 4 is a flow chart of yet another example method, routine, or process for receiving vehicle safety information.

FIG. 4 is a flow chart of yet another example method, routine, or process 400 for receiving vehicle safety information, such as the safety information associated with the vehicle 102. More particularly, the example method, routine, or process 400 may be implemented in conjunction with current ownership of the vehicle 102.

One or more processors, which may be one or more processors of the user computing device (or devices) (e.g., the mobile phone 104, the computing device 106, and/or the vehicle information system 107), may determine whether the owner of the vehicle 102 is an insured party of the insurance provider and has the insured party vehicle recognition application 166B (block 402). If the owner of the vehicle 102 is not an insured party or does not have the insured party vehicle recognition application 166B, the functions described above with respect to blocks 206 and 208 may be performed. If the owner of the vehicle 102 is an insured party with the insured party vehicle recognition application 166B, the functions described above with respect to block 210 may be performed.

From performance of the actions described with respect to block 208 or the actions described with respect to block 210, flow may proceed to the one or more processors querying the at least one additional device 110 in a similar manner as discussed with respect to block 212 (block 404). Safety information associated with the vehicle 102 may be received that may include information regarding at least one of one or more active recalls associated with the vehicle 102, one or more investigations associated with the vehicle 102, or instructions to visit a web site (e.g., <http://www.safercar.gov>) to enter a VIN and receive further instructions, such as further information regarding whether an active recall applies to the vehicle 102 and/or manufacturer contact information, etc. (block 406). At least a portion of the safety information may be made available to the owner (block 408). The instructions to enter a VIN may be received and made available, for example, in order to provide verification of the correct VIN, even though the VIN may already be known because of the owner's status as an insured party, as discussed above.

In one embodiment, with respect to the implementation of the actions described with respect to block 210 in at least the example of FIG. 4, the vehicle 102 may be identified based on the VIN and the actions described with respect to blocks 404, 406, and 408 may be performed at intervals with or without user prompting to cause performance of such actions. For example, such actions may be performed on a monthly basis to check for active recalls and other issues, including other safety issues discussed herein.

Accordingly, it will be appreciated that the system and methods disclosed herein allow, among other advantages, an owner or prospective purchaser of a vehicle to determine safety information regarding the vehicle without having to visit a web site such as <http://www.safercar.gov> and enter information regarding the vehicle into such a web site. In other embodiments, the system and methods allow the owner or prospective purchaser to be guided to such a web site and need to enter only a portion of the information conventionally required to be entered. The disclosed embodiments provide improved access to and awareness of vehicle safety information in the context of both ongoing ownership of a vehicle and purchase of a vehicle (e.g., a used vehicle). Other advantages will be recognized by one of ordinary skill in the art in light of the teaching and disclosure herein.

III. Additional Considerations

The following additional considerations apply to the foregoing discussion. Throughout this specification, plural instances may implement functions, components, operations, or structures described as a single instance. As noted above, although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The methods described in this application may include one or more functions or routines in the form of non-transitory computer-executable instructions that are stored in a tangible computer-readable storage medium and executed using a processor of a computing device (e.g., the mobile phone 104, the computing device 106, the vehicle information system 107, the insurance provider server 114, the vehicle safety information server 118, and/or any other computing devices within the example system 100 in any suitable combination). The routines may be included as part of any of the modules described in relation to FIG. 1A or as part of a module that is external to the system illustrated by FIG. 1A. For example, the methods or portions thereof may be part of a browser application(s) or an application(s) running on any of the devices in the example system 100 as a plug-in or other module of the browser application. Further, the methods may be employed as "software-as-a-service" to provide, for example, the mobile phone 104, the computing device 106, the vehicle information system 107, the insurance provider server 114, the vehicle safety information server 118, and/or any other computing devices with access to the example system 100.

Additionally, certain aspects are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain functions). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules may provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and may operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Still further, the figures depict preferred embodiments of an example system 100 and methods for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and method for receiving vehicle safety information. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope of defined in the appended claims.

To the extent that any meaning or definition of a term in this document conflicts with any meaning or definition of the same term in a document incorporated by reference, the meaning or definition assigned to that term in this document shall govern. Although the text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A vehicle safety information system comprising:
a vehicle information device disposed within a vehicle;
a vehicle safety information server;
a remote computing device communicatively interfaced with the vehicle information device; and
a user computing device communicatively interfaced with the remote computing device and comprising:
a processor,
an image capturing component, and
a memory;
wherein the processor is configured to:
determine that an insured party vehicle recognition application is not downloaded on the user computing device,
in response to determining that the insured party vehicle recognition application is not downloaded, access a most-recent image of the vehicle captured by the image capturing component, wherein the most-recent image of the vehicle depicts a portion of the exterior of the vehicle,
analyze the most-recent image of the vehicle in combination with image data associated with a plurality of known vehicles to determine identifying information associated with the vehicle, wherein the identifying information associated with the vehicle comprises a make, a model, or a year of the vehicle, and
transmit the identifying information associated with the vehicle to the remote computing device via a computer network;
the remote computing device configured to:
query the vehicle safety information server with the identifying information associated with the vehicle to obtain safety information associated with the vehicle,
identify a particular amount of time that has passed since the safety information associated with the vehicle was last provided to the user computing device, and
based on the particular amount of time exceeding a threshold amount of time, transmit, to the vehicle information device, a set of changes to the safety information associated with the vehicle that have occurred since the identifying information associated with the vehicle was last transmitted by the user computing device,
wherein the vehicle information device comprises a user interface configured to present the set of changes to the safety information associated with the vehicle for review by a user of the user computing device.

2. The vehicle safety information system of claim 1, wherein the remote computing device is further configured to:
access the threshold amount of time from a database.

3. The vehicle safety information system of claim 1, wherein the safety information is provided to the vehicle safety information server by a party other than each of an insurance provider, a prospective purchaser of the vehicle, and an owner of the vehicle.

4. The vehicle safety information system of claim 1, further comprising:
an insurance provider server configured to access safety information from the vehicle safety information server.

5. The vehicle safety information system of claim 1, wherein the identifying information associated with the vehicle is provided to the user computing device by the user of the user computing device.

6. The vehicle safety information system of claim 1, wherein providing the safety information to the user computing device is further based on an analysis of information provided to the user computing device.

7. The vehicle safety information system of claim 1, wherein the user computing device is further configured to:
receive information related to a financing of the vehicle; and
based on the information related to the financing of the vehicle, determine that the identifying information associated with the vehicle is to be transmitted to the remote computing device.

8. A computer-implemented method for receiving safety information associated with a vehicle, the method comprising:
determining, by a processor of a user computing device, that an insured party vehicle recognition application is not downloaded on the user computing device;
in response to determining that the insured party vehicle recognition application is not downloaded, accessing, by the processor, a most-recent image of a vehicle captured by an image capturing component of the user computing device, wherein the most-recent image of the vehicle depicts a portion of the exterior of the vehicle;
analyzing, by the processor, the most-recent image of the vehicle in combination with image data associated with a plurality of known vehicles to determine identifying information associated with the vehicle, wherein the identifying information associated with the vehicle comprises a make, a model, or a year of the vehicle;
transmitting, by the processor, the identifying information associated with the vehicle to a remote computing device via a computer network;
querying, by the remote computing device, a vehicle safety information server with the identifying information associated with the vehicle to obtain safety information associated with the vehicle;
identifying, by the remote computing device, a particular amount of time that has passed since the safety information associated with the vehicle was last provided to the user computing device;
based on the particular amount of time exceeding a threshold amount of time, transmitting, by the remote computing device, to a vehicle information device disposed within the vehicle, a set of changes to the safety information associated with the vehicle that have occurred since the identifying information associated with the vehicle was last transmitted by the user computing device; and
presenting, by a user interface of the vehicle information device, the set of changes to the safety information associated with the vehicle for review by a user of the user computing device.

9. The method of claim 8, further comprising:
accessing, by the remote computing device, the threshold amount of time from a database.

10. The method of claim 8, wherein the safety information is provided to the vehicle safety information server by a party other than each of an insurance provider, a prospective purchaser of the vehicle, and an owner of the vehicle.

11. The method of claim 8, further comprising:
accessing, by an insurance provider server, safety information from the vehicle safety information server.

12. The method of claim 8, wherein the identifying information associated with the vehicle is provided to the user computing device by the user of the user computing device.

13. The method of claim 8, wherein providing the safety information to the user computing device is further based on an analysis of information provided to the user computing device.

14. The method of claim 8, further comprising:
receiving, by the user computing device, information related to a financing of the vehicle; and
based on the information related to the financing of the vehicle, determining, by the user computing device, that the identifying information associated with the vehicle is to be transmitted to the remote computing device.

15. A non-transitory computer readable storage medium comprising computer readable instructions stored thereon for receiving safety information associated with a vehicle, wherein the instructions when executed on one or more processors cause the one or more processors to:
determine that an insured party vehicle recognition application is not downloaded on a user computing device;
in response to determining that the insured party vehicle recognition application is not downloaded, access a most-recent image of the vehicle captured by an image capturing component of the user computing device, wherein the most-recent image of the vehicle depicts a portion of the exterior of the vehicle;
analyze the most-recent image of the vehicle in combination with image data associated with a plurality of known vehicles to determine identifying information associated with the vehicle, wherein the identifying information associated with the vehicle comprises a make, a model, or a year of the vehicle;
transmit the identifying information associated with the vehicle to a remote computing device via a computer network;
query, by the remote computing device, a vehicle safety information server with the identifying information associated with the vehicle to obtain safety information associated with the vehicle;
identify, by the remote computing device, a particular amount of time that has passed since the safety information associated with the vehicle was last provided to the user computing device;
based on the particular amount of time exceeding a threshold amount of time, transmit, by the remote computing device, to a vehicle information device disposed within the vehicle, a set of changes to the safety information associated with the vehicle that have occurred since the identifying information associated with the vehicle was last transmitted by the user computing device; and
present, by a user interface of the vehicle information device, the set of changes to the safety information associated with the vehicle for review by a user of the user computing device.

16. The non-transitory computer readable storage medium of claim 15, further comprising computer readable instructions stored thereon that, when executed on the one or more processors, cause the one or more processors to:

access, by the remote computing device, the threshold amount of time from a database.

17. The non-transitory computer readable storage medium of claim 15, wherein the safety information is provided to the vehicle safety information server by a party other than each of an insurance provider, a prospective purchaser of the vehicle, and an owner of the vehicle.

18. The non-transitory computer readable storage medium of claim 15, wherein the identifying information associated with the vehicle is provided to the user computing device by the user of the user computing device.

19. The non-transitory computer readable storage medium of claim 15, wherein providing the safety information to the user computing device is further based on an analysis of information provided to the user computing device.

20. The non-transitory computer readable storage medium of claim 15, further comprising computer readable instructions stored thereon that, when executed on the one or more processors, cause the one or more processors to:
  receive, by the user computing device, information related to a financing of the vehicle; and
  based on the information related to the financing of the vehicle, determine, by the user computing device, that the identifying information associated with the vehicle is to be transmitted to the remote computing device.

\* \* \* \* \*